Oct. 19, 1926.

S. J. VESELY 1,603,564

VEHICLE SPRING REBOUND ARRESTER

Filed July 6, 1925

Inventor
Stanley J. Vesely
By J. M. St. John
Attorney

Patented Oct. 19, 1926.

1,603,564

UNITED STATES PATENT OFFICE.

STANLEY J. VESELY, OF CEDAR RAPIDS, IOWA.

VEHICLE SPRING REBOUND ARRESTER.

Application filed July 6, 1925. Serial No. 41,614.

This invention relates to auxiliary springs for automobile bodies sometimes called "snubbers", and designed to arrest the upward rebound of the body when the wheel drops into a rut.

Figure 1:
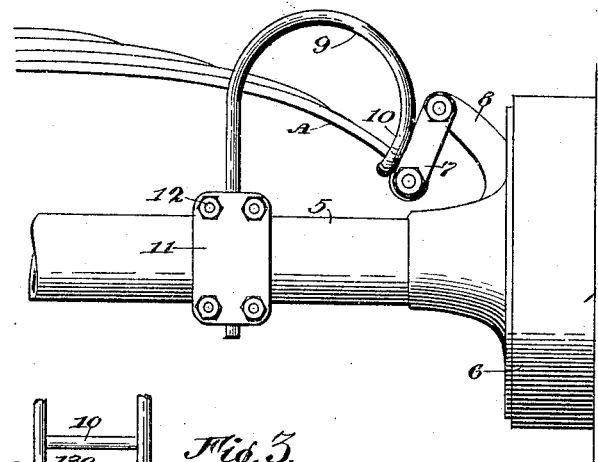
Figure 3:
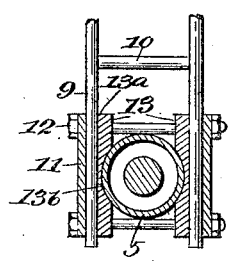
Figure 2:
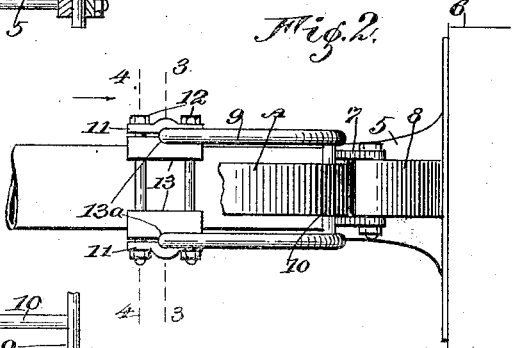
Figure 4:
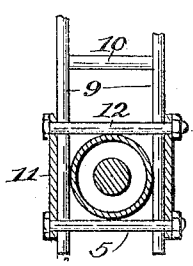

The invention is fully disclosed in the description and claims following, reference being had to the accompanying drawing, in which:

Fig. 1 is a rear elevation of an anti-rebound spring embodying my invention as in use. Fig. 2 is a plan view of the same. Fig. 3 is a detail section in the line 3—3 of Fig. 2. Fig. 4 is a sectional detail in the line 4—4, showing a slightly simpler clamping device than that shown in Fig. 3.

In the drawing, the numeral 5 denotes the axle housing and 6 the brake drum of an automobile of a familiar type. In the case of this particular automobile, the rear spring, A, (front spring, as well), is mounted parallel with the axle. At the ends it connects by pairs of links, or shackles 7 with posts 8 forming parts of the terminal flanges of the housing. In the drawing but one end of the housing is shown, but it is to be understood that the opposite end is a duplicate. In case of an extremely sharp jolt the body of the automobile may carry the spring so high as to reverse the normal position of the shackle, or at least draw it up so high as to cause a very sudden jar at the limit of the up-stroke. To arrest this rebound and thereby soften the effect on the occupants of the car is the purpose of this invention.

The device is very simple, and consists of a double C spring 9 looped at the free end 10 to press against the links of the shackel, as shown. The legs of the spring are held in position astride the housing by clamping plates 11 and bolts 12. In Fig. 4 this is all the fastening shown, and serves the purpose very well. It is preferred, however, to interpose seat-plates 13 between the legs of the spring and the housing, the plates being grooved at 13$^a$ to receive the spring, and at 13$^b$ for the sides of the housing.

The clamp may be adjusted on the housing so as to bring any desired pressure against the shackle, tending to force it outwardly, and thus to counteract effectually, but elastically, the rebound of the leaf spring.

Having thus described my invention, I claim:

1. In combination with a vehicle spring and its supporting shackle and shackle support, a forked compression spring fixed astride the shackle support, and with its free end disposed to press against the shackle and oppose its rebound.

2. In combination with a vehicle spring, a supporting axle and connected post and shackle, a curved and looped spring having legs to straddle the axle, and with its looped free end abutting against the shackle, and a clamp to secure the legs to the axle.

In testimony whereof I affix my signature.

STANLEY J. VESELY.